United States Patent

Bentsen

[15] 3,670,745

[45] June 20, 1972

[54] DIAPHRAGM LOGIC CONTROL CIRCUIT FOR ELECTRIC HEATING SYSTEM

[72] Inventor: Louis J. Bentsen, Arlington Heights, Ill.
[73] Assignee: Honeywell Inc., Minneapolis, Minn.
[22] Filed: March 11, 1971
[21] Appl. No.: 123,290

[52] U.S. Cl..................................137/84, 236/47, 236/1 B
[51] Int. Cl.............................G05b 11/50, G05d 16/00
[58] Field of Search............137/81.5, 341, 84; 235/201 ME, 235/201 FS, 200 UB; 236/47, 1 B

[56] References Cited

UNITED STATES PATENTS

| | | | |
|---|---|---|---|
| 3,090,552 | 5/1963 | Raider | 235/201 ME |
| 3,140,047 | 7/1964 | Holloway | 236/47 X |
| 3,305,172 | 2/1967 | Duchek et al. | 236/47 X |
| 3,433,257 | 3/1969 | Jensen | 235/201 ME |
| 3,540,477 | 11/1970 | Hogel | 235/201 ME |
| 3,567,115 | 12/1970 | Nelson | 236/1 B |
| 3,570,518 | 3/1971 | Hatch, Jr. | 235/201 ME |
| 3,575,343 | 4/1971 | Kreuter et al. | 236/47 |
| 3,602,427 | 8/1971 | Joesting | 236/1 B |

Primary Examiner—Samuel Scott
Attorney—Lamont B. Koontz and Marvin T. Fabyanske

[57] ABSTRACT

A pneumatic, diaphragm logic circuit for controlling a step controller in a day-night, electric heat, temperature control system. The circuit establishes maximum heating when the branch line pressure of the thermostat is below a predetermined minimum, and establishes either modulated heating during the day or zero heating during the night when the branch line pressure exceeds the predetermined minimum.

7 Claims, 4 Drawing Figures

INVENTOR.
LOUIS J. BENTSEN

BY

ATTORNEY.

DIAPHRAGM LOGIC CONTROL CIRCUIT FOR ELECTRIC HEATING SYSTEM

BACKGROUND AND SUMMARY OF THE INVENTION

This invention relates to a pneumatic, diaphragm logic circuit for controlling a step controller in a day-night, electric heat, temperature control system and is particularly adapted for use in a unit ventilator control system.

Such a system usually includes: a main pressure source; a day-night pneumatic thermostat; control circuitry for controlling a step controller, which in turn controls the amount of electric current delivered to a heating source; and a pressure-to-electric (P-E) switch for controlling a fan. Such a system may also include either an air motion relay or an electric interlock. The air motion relay senses the movement of the air being circulated by the fan. If the air motion relay does not sense air movement, it immediately causes the cessation of heating. The electric interlock ties together the fan and the heating means so that there can be no heating unless the fan is operating.

A system having the above-named elements typically operates as follows. During the day if the thermostat pressure output or branch line pressure falls below a predetermined minimum, such as 3 psi, which is indicative of a heavy heat demand, maximum heating will be established. As the branch line pressure increases above 3 psi, which is indicative of a diminishing demand for heat, the amount of heat delivered will be correspondingly less. When a second predetermined pressure is attained, such as 8 psi, which is indicative of a satisfied condition or zero heating demand, no heat will be delivered. During the day the fan runs continuously.

During the night the main pressure may cause the thermostat to control to a somewhat lower temperature. Again when the branch line pressure falls below 3 psi, maximum heating will be established and the fan, which is ordinarily off, will be turned on. When the branch line pressure rises above 3 psi, no heat whatsoever will be delivered. When the branch line pressure exceeds 6 psi the fan will be turned off by the P-E switch. A heat dissipation switch is usually connected in parallel with the P-E switch. The heat dissipation switch may override the P-E switch and keep the fan on if there is residual heat in the heating means, even though the branch line pressure exceeds 6 psi.

Previous arrangements which have provided the above-described functions have included pressure regulators and both P-E and E-R switches, and have in general been comprised of rather expensive and bulky equipment. On the other hand the present invention provides a miniaturized control circuit which is interfaceable with standard equipment and which provides all of the required control functions with a substantial reduction in both the size and the cost of the control circuitry previously required. The present invention has a further advantage that the branch line pressure from the thermostat is dead-ended at all points in the circuit to which it is connected in order to eliminate the disturbance of thermostat control point due to branch line pressure bleeding which has been a problem in prior art arrangements.

Further advantages of the subject invention will appear from a reading of the detailed description of the invention in view of the drawing wherein:

FIG. 1a is a table summarizing the pressure outputs of the inventive circuit to the step controller under various conditions;

DETAILED DESCRIPTION OF THE INVENTION

Figure 1:
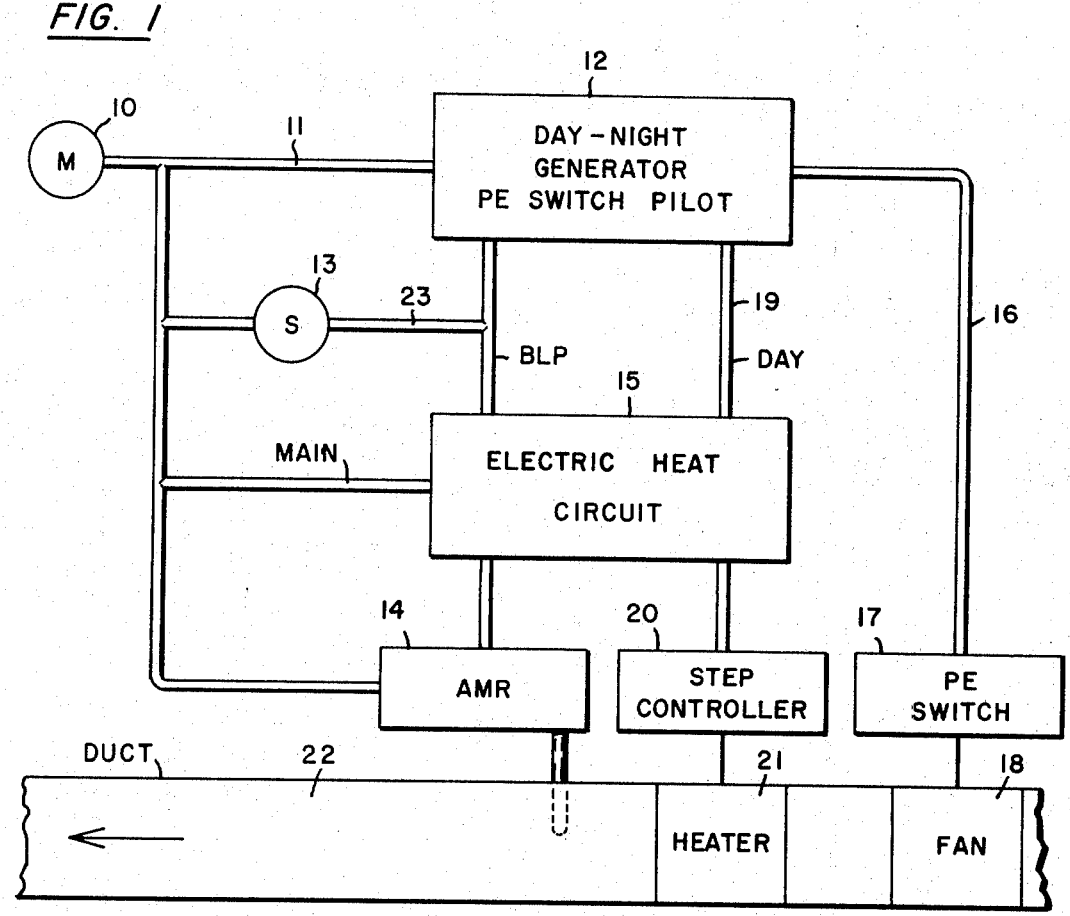
FIG. 1 is a schematic illustration of a pneumatic temperature control system utilizing the subject invention.

In FIG. 1 a main pressure source 10 is connected via conduit 11 to a day-night signal generator and P-E switch pilot circuit 12, a pneumatic, day-night thermostat 13, an air motion relay 14 and an electric heat circuit 15. The day-night signal generator and P-E switch pilot circuit, or diaphragm valve means, 12 provides a signal via conduit 16 to a P-E switch 17 which controls fan 18. The diaphragm valve means 12 also provides a pressure signal indicative of day operation via conduit 19 to the electric heat circuit or pneumatic, diaphragm logic circuit 15. The thermostat 13 provides a branch line pressure output which is indicative of the temperature of the space wherein the thermostat is located. This output is transmitted via conduit 23 to both the diaphragm valve means 12 and the pneumatic, diaphragm logic circuit 15. The air motion relay or relay means 14, which is responsive to the movement of air being circulated by fan means 18 in duct 22, merely transmits main air pressure to circuit 15 so long as air movement is sensed. The circuit 15 provides a pressure output signal to a step controller 20 which in turn controls the flow of electrical current to heating means 21. The step controller, comprising simply an actuator, a plurality of switches, and a camming arrangement, may be of the type such as is disclosed in the copending application of Leo Alamprese, Ser. No. 877,892, filed Nov. 19, 1969. Such a step controller provides for zero heating when the pressure is less than about 3 psi, maximum heating when pressure is about 3 psi, and modulated or reduced heating upon a further increase in the pressure up to about 8 psi, when zero heating is again provided.

In a day-night temperature control system the main pressure source typically provides two separate pressures, one for day operation, such as 16 psi, and one for night operation, such as 22 psi. These pressures are generated by means not shown. As tabulated in FIG. 1a, during day operation diaphragm valve means 12 transmits to circuit 15 via conduit 19 a pressure signal indicative of day operation which signal is merely the day main pressure of 16 psi. The output of relay means 14 to the circuit 15 is also 16 psi since the fan runs continuously during the day. If the branch line pressure transmitted by thermostat 13 to the circuit 15 is less than 3 psi, the output of the circuit 15 to the step controller will be 3 psi so that maximum heating is established. On the other hand if the branch pressure is greater than 3 psi, the output of the circuit 15 to the step controller 20 will be equal to the branch line pressure input to circuit 15 so that modulated heating is provided. During night operation when the main pressure is 22 psi, the pressure transmitted by the diaphragm valve means 12 via conduit 19 to the circuit 15 is 0 psi. The pressure transmitted by the relay means 14 to the circuit 15 is either the 22 psi night main pressure when the fan is operating or 0 psi when the fan is off. When the branch line pressure is less than 3 psi, the output of the circuit 15 to the step controller will be 3 psi which again establishes maximum heating. When the branch line pressure exceeds 3 psi, the output of circuit 15 becomes zero so that no heat is provided by the heating means. The fan in turned on when the branch line pressure falls below approximately 4 psi and is turned off when the branch line pressure rises above 6 psi.

Figure 3:
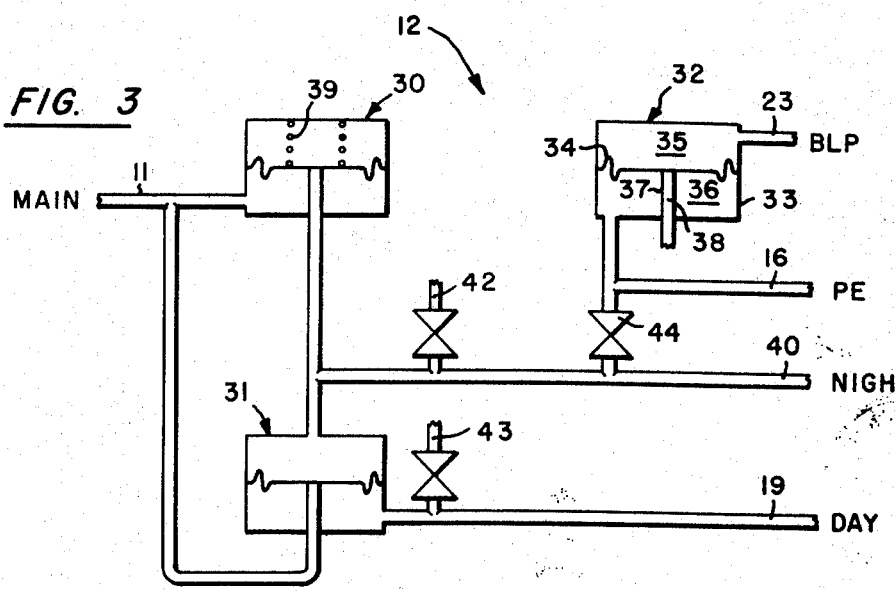
FIG. 3 is a schematic illustration of a diaphragm logic circuit for providing a pressure signal indicative of day operation to the diaphragm logic circuit of FIG. 2 and for providing a control signal to the P-E fan switch.

FIG. 3 is a schematic illustration of the diaphragm valve means or day-night signal generator and P-E switch pilot circuit 12 illustrated in FIG. 1. The diaphragm valve means 12 is comprised of three valve means 30, 31 and 32, each of which is comprised of a housing 33 divided by a diaphragm 34 into a control chamber 35 and flow chamber 36. Disposed within the flow chamber 36 is a partition means 37 which further defines, in conjunction with the diaphragm 34, a valving chamber 38. Disposed within the control chamber 35 of valve means 30 is a spring or biasing means 30 which holds valve means 30 closed until the main pressure in the flow chamber of valve means 30 exceeds approximately 18 psi. After valve means 30 opens pressure is transmitted from the main pressure source through conduit 11 through the flow and valving chambers of valve means 30, through conduit 45 and into the control chamber of valve means 31 to thereby close valve means 31. Accordingly when the main pressure is 22 psi, corresponding to night operation, valve means 30 is opened so that a night main pressure signal is provided at outlet 40. When the main pressure is, on the other hand, 16 psi, corresponding to day operation, the valve means 30 is closed so that valve means 31 is allowed to open. Pressure is thereby transmitted from the main pressure source through conduit 11, through the valving and flow chambers of valve means 31, to conduit 19. This pressure signal, indicative of day operation, is transmitted via conduit 19 to the electric heat circuit 15 as illustrated in FIG. 1. Restricted bleeds 42 and 43 are provided in the conduits providing the day and night signals in order that the conduits may bleed down upon a switching over from day to night or night to day operation.

Valve means 32 is essentially a pressure reducing valve with the biasing means being the branch line pressure from the thermostat 13 instead of a spring. During night operation main pressure is transmitted through valve means 30, through restriction 44 and into the flow chamber 36 of valve means 32. Because the valving chamber 38 is allowed to communicate directly with the atmosphere as illustrated, the output pressure at 16 will be regulated or reduced to a pressure equivalent to the branch line pressure. This equivalent of branch line pressure is transmitted to the P-E switch 17 (as illustrated in FIG. 1) during night operation. Because the P-E switch 17 is arranged to turn the fan on when the pressure falls below 4 psi and is further arranged to turn the fan off when the pressure rises above 6 psi, the fan will be normally off during the night and will cycle only when maximum heating is called for by the thermostat. Because the branch line pressure from the thermostat is dead-ended in control chamber 35, the control point of the thermostat is not upset as a result of branch line pressure bleeding, even though branch line or a pressure equivalent to branch line pressure is transmitted directly to the P-E switch 17 (FIG. 1).

It will be noted that the night pressure outlet 40 is not utilized in the system schematically illustrated in FIG. 1. It is depicted in FIG. 3 only to show the availability of such a signal which may be used in other systems. Only the day signal output at outlet 19 is utilized as will be described in connection with FIG. 2. Clearly other valving arrangements besides that depicted in FIG. 3 may be used in the system of FIG. 1 to provide a day signal. The arrangement of FIG. 3 is intended only to be exemplary.

Figure 2:
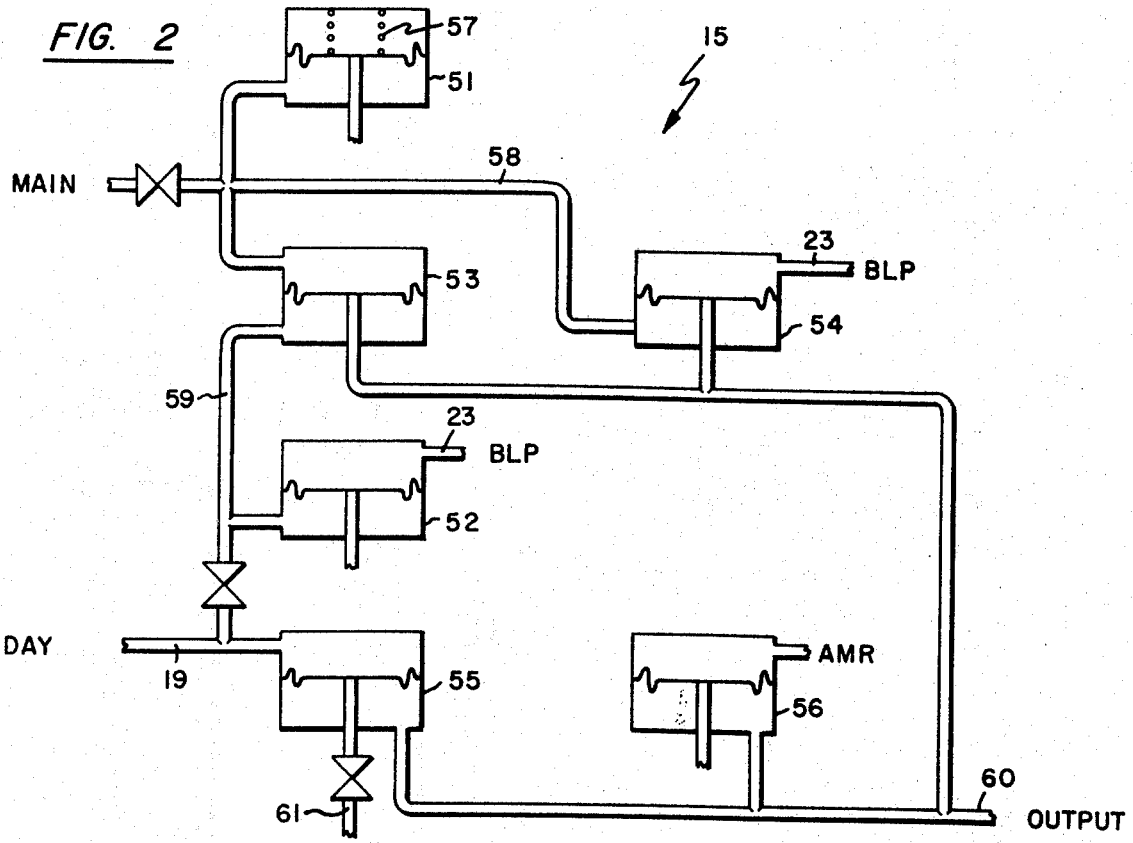
FIG. 2 is a schematic illustration of the inventive diaphragm logic circuit.

FIG. 2 is a schematic illustration of the electric heat circuit or pneumatic diaphragm logic circuit 15 shown in FIG. 1. The circuit 15 is comprised of six valve means 51–56 of the type described in connection with FIG. 3. First pressure reducing valve means 51 has disposed in the control chamber thereof a biasing spring 57 which is arranged to regulate or reduce the pressure input from the main or first pressure source to approximately 3 psi. This pressure is transmitted through conduit 58 to the flow chamber of first valve means 54 and also to the control chamber of second valve means 53. Second pressure reducing valve means 52 operates in a fashion identical to valve means 32 described in connection with FIG. 3. Second pressure reducing valve means 52 is supplied with pressure from a second pressure source via conduit 19 which transmits the day main pressure signal from valve means 31. As in the case of valve means 32, the second pressure reducing valve means 52 is supplied with branch line pressure to its control chamber which is again dead-ended. The output of second pressure reducing valve means 52 is equivalent to branch line pressure and is transmitted through conduit 59 to the flow chamber of second valve means 53.

The valving chambers of first and second valve means 54 and 53 are connected to the outlet 60 of the circuit 15. As noted above, the 3 psi output of the first pressure reducing valve means is transmitted to the flow and control chambers of the first and second valve means 54 and 53 respectively. In addition branch line pressure from the thermostat 13 (a third pressure source) is transmitted to the control chamber of the first valve means 54 and the equivalent of branch line pressure is transmitted to the flow chamber of the second valve means 53. Thus in both the first and second valve means 54 and 53 branch line pressure, (or its equivalent) in the control and the flow chambers respectively is opposed by the output of the first pressure reducing valve means in the flow and control chambers respectively. Accordingly, during day operation the first and second valve means 54 and 53 operate to identify the highest of two pressures, the output of the first pressure reducing valve means 51, and branch line pressure. The highest of these two pressures is accordingly transmitted to the outlet 60 and to the step controller 20 in FIG. 1. Hence, as is tabulated in FIG. 1a, when the branch line pressure is less than 3 psi, the output of first pressure reducing valve means 51, which is 3 psi, is transmitted to the outlet 60. On the other hand when the branch line pressure exceeds 3 psi, the output of second pressure reducing valve means 52, which is the equivalent of branch line pressure is transmitted to the outlet 60.

During night operation the pressure signal transmitted by valve means 31 via conduit 19 to second pressure reducing valve means 52 is zero. Accordingly the pressure is the flow chamber of second valve means 53 is zero. The first and second valve means 54 and 53 still operate to identify the higher of the two pressures, branch line pressure and the output of the first pressure reducing valve means 51, which is still 3 psi. As during day operation, if the branch line pressure is greater than 3 psi, the output of the second pressure reducing valve means 53, which is now zero, is transmitted to the outlet 60. If the branch line pressure is less than 3 psi, the output of first pressure reducing valve means 51, which is still 3 psi, is transmitted to the outlet 60.

During day operation the main pressure transmitted through conduit 19 causes fourth valve means 55 to remain closed. However during the night the pressure in the control chamber of valve means 55 is zero. Accordingly, since the outlet 60 is connected directly to the flow chamber of valve means 55, valve means 55 provides the function of allowing the output pressure of the circuit 15 to bleed down to zero when the branch line pressure exceeds 3 psi. When the branch line pressure is less than 3 psi during night operation, some air will bleed through valve means 55 and restricted bleed 61 but not enough to affect the control of the step controller.

Third valve means 56, the control chamber of which is adapted to be connected to the air motion relay or relay means 14 (a fourth pressure source), provides a function of dumping the output pressure of the circuit 15 into atmosphere immediately upon the sensing by relay means 14 of no air movement. This precludes overheating of heating means 21 due to a lack of air movement to circulate the heat generated by means 21.

While specific pressures and embodiments have been referred to while describing the subject invention, it is intended that the scope of the invention be limited only by the scope of the appended claims.

The embodiments of the invention in which an exclusive property or right is claimed are defined as follows:

1. A pneumatic diaphragm logic circuit for use in a day-night condition control system comprising:
   first pressure reducing valve means adapted to be connected to a first pressure source and arranged to provide a predetermined pressure output;
   second pressure reducing valve means adapted to be connected to a second pressure source and arranged to provide a predetermined pressure output;
   outlet means;
   first and second valve means connected to the outlet means, the first valve means adapted to be connected to a third pressure source;
   means to transmit the output of the first pressure reducing valve means to the first and second valve means; and,
   means to transmit the output of the second pressure reducing valve means to the second valve means, whereby the first and second valve means identify the higher of the outputs of the third pressure source and the first pressure reducing valve means, and transmit to the outlet means either the output of the second pressure reducing valve means if the output of the third pressure source is the higher, or the output of first pressure reducing valve means if the output of the first pressure reducing valve means is the higher.

2. A pneumatic diaphragm logic circuit according to claim 1 wherein the first pressure source provides a main line pressure, the second pressure source provides a pressure signal indicative of day operation, and the third pressure source provides a branch line pressure indicative of the condition.

3. A pneumatic diaphragm logic circuit according to claim 1 further comprising third valve means connected to the outlet and responsive to a fourth pressure source, the third valve means arranged to connect the outlet to atmosphere when the output of the fourth pressure source is zero.

4. A pneumatic diaphragm logic circuit according to claim 1 further comprising fourth valve means connected to the second pressure source and to the outlet and arranged to connect the outlet to atmosphere through a restriction when the output of the second pressure source is zero.

5. A pneumatic diaphragm logic circuit according to claim 1 wherein the second pressure reducing valve means is connected to the third pressure source, the output of the second pressure reducing valve means being equivalent to branch line pressure when the output of the second pressure source is indicative of day operation.

6. A pneumatic diaphragm logic circuit according to claim 1 wherein the first and second pressure reducing valve means and the first and second valve means each comprises:

housing means;

diaphragm means dividing the housing into a control chamber and a flow chamber;

partition means disposed within the flow chamber and arranged to cooperate with the diaphragm means in a sealable relation to further define a valving chamber.

7. A pneumatic diaphragm logic circuit according to claim 6 wherein:

the flow chamber of the first pressure reducing valve means is connected to the first pressure source and to the flow chamber of the first valve means and the control chamber of the second valve means;

the valving chambers of the first and second valve means are connected to the outlet;

the control chambers of the first valve means and second pressure reducing valve means are connected to the third pressure source; and the flow chambers of the second pressure reducing valve means and the second valve means are connected to the second pressure source.

* * * * *